(12) United States Patent
Park

(10) Patent No.: US 11,141,023 B2
(45) Date of Patent: Oct. 12, 2021

(54) CUTTING BOARD THAT AIDS IN THE COLLECTION OR DISPERSAL OF PREPARED MATERIAL

(71) Applicant: James Park, Brooklyn, NY (US)

(72) Inventor: James Park, Brooklyn, NY (US)

( * ) Notice: Subject to any disclaimer, the term of this patent is extended or adjusted under 35 U.S.C. 154(b) by 191 days.

(21) Appl. No.: 16/437,575

(22) Filed: Jun. 11, 2019

(65) Prior Publication Data
US 2020/0390290 A1 Dec. 17, 2020

(51) Int. Cl.
*A47J 47/00* (2006.01)

(52) U.S. Cl.
CPC .................................. *A47J 47/005* (2013.01)

(58) Field of Classification Search
CPC ....................................................... A47J 47/005
See application file for complete search history.

(56) References Cited

U.S. PATENT DOCUMENTS

2010/0236426 A1* 9/2010 Stewart ................. A47J 47/005
99/645
2017/0020341 A1* 1/2017 Farmer ................... A47J 43/22

OTHER PUBLICATIONS

Chocolate and Zucchini article "Why Does Food Stick To My Knife? (And How to Make It Stop)". Sep. 25, 2013. (https://cnz.to/tips-tricks/why-does-food-stick-to-my-knife-and-how-to-make-it-stop/). (Year: 2013).*

* cited by examiner

*Primary Examiner* — David P Bryant
*Assistant Examiner* — Nirvana Deonauth
(74) *Attorney, Agent, or Firm* — Carter, Deluca & Farrell LLP; Francesco Sardone, Esq.

(57) ABSTRACT

A cutting board having a curved chamber wall along a side portion for collecting foodstuff in and pouring foodstuff from a chamber spaced defined by the chamber wall. The chamber wall provides a concaved top face for facilitating wiping a cutting utensil clean of foodstuff so that the wiped-off foodstuff falls toward the center of the cutting surface.

4 Claims, 4 Drawing Sheets

US 11,141,023 B2

CUTTING BOARD THAT AIDS IN THE COLLECTION OR DISPERSAL OF PREPARED MATERIAL

BACKGROUND OF THE INVENTION

The present invention relates to cutting boards and, more particularly, to a cutting board that aids in the collection or dispersal of prepared material.

Managing food cuttings on cutting boards can be problematic as the desired cuttings and undesired debris frequently falls off the edge of the cutting board onto the cutting board's supporting surface or floor. This, at the very least, requires time-consuming cleanup as well as creates a potential safety issue. Moreover, in fast-paced food preparation settings, where several food items need to be chopped, sliced, and/or diced on the cutting board over a short amount of time, multiple food items need occupy the same cutting surface of the cutting board, further increasing the likelihood of such spills for conventional cutting boards as well as causing the unwanted mixing of different foodstuffs on the cutting surface.

In other words, current designs of cutting boards too easily allow cuttings and debris to fall off the cutting board since typically there is no structure to corral food items on a limited cutting surface. Most cutting boards do not even address this problem, providing only a simple flat surface to manage the food and cuttings. The designs that do have a collective edge or fence, are not designed with a top side curved edge for wiping food off of the cutting utensil so that such foodstuff falls toward the center (not the edges) of the cutting surface. These barriers are straight and so define a volume above the cutting surface, cramped by the vertical barrier, limiting the volume for the piling up and collection of food stuff along the edges of the cutting area. Current cutting boards also do not specifically adapt the top edge of such planar barriers to wipe food off of the cutting utensil so that the wiped off foodstuff falls towards the center of the cutting surface.

As can be seen, there is a need for a cutting board that aids in the collection or dispersal of chopped, prepared food, wherein the cutting board provides an curved chamber wall that is located towards the side of the cutting board, wherein the curved chamber wall provides a top face for wiping debris off of the knife so that such debris falls toward the center of the cutting board.

Also, the curved chamber wall of the present invention defines a holding volume for collecting foodstuff that is greater than volumes afforded by merely vertical barriers. Furthermore, the curved shape of the chambered wall enables funneling the chopped foodstuff to a desired location, whereby the foodstuff. Thereby, the problem of transferring prepared foodstuff from the cutting board surface to its next destination (for example, a preparation bowl, pot, or trash) is eliminated.

In sum, the present invention improves on current designs by embodying a cutting board with a wavelike curved chamber wall at one end for providing a curved chamber space, affording more volume for the collection foodstuff. A top face of the curved chamber wall is concave, so that its corners extend farther over the cutting surface than its midpoint. The top face of said chamber enables wiping the cutting surface, whereby the wiped-off food stuff falls towards the center of the cutting surface, not the edges.

SUMMARY OF THE INVENTION

In one aspect of the present invention, a cutting board includes a generally cutting surface defined in part by a chamber wall; and the chamber wall extends upward and away from the cutting surface before curving back toward a center of the cutting surface, wherein a distal end of the chamber wall terminates in a concave top face disposed over the cutting surface.

In another aspect of the present invention, the method of managing chopped foodstuff includes the following providing the above mentioned cutting board of claim; using the cutting surface to chop a plurality of foodstuff with a cutting utensil; sliding blade over an upper edge of the concave top face so that foodstuff contacting said upper edge falls toward a center of the cutting surface; tilting said cutting board so that the plurality of foodstuff slides or tumbles to a chamber space defined by the chamber wall; and tilting said cutting board so that the plurality of foodstuff slides or tumbles along an inner curvature of the chamber wall.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a cutting board having a curved chamber wall along a side portion for collecting prepared and/or chopped foodstuff in a chamber spaced defined by the chamber wall. The foodstuff can be easily poured from the curved chamber space when dispensing. The chamber wall provides a concaved top face for facilitating wiping a cutting utensil clean of foodstuff so that the wiped-off foodstuff falls toward the center of the cutting surface.

Figure 1:
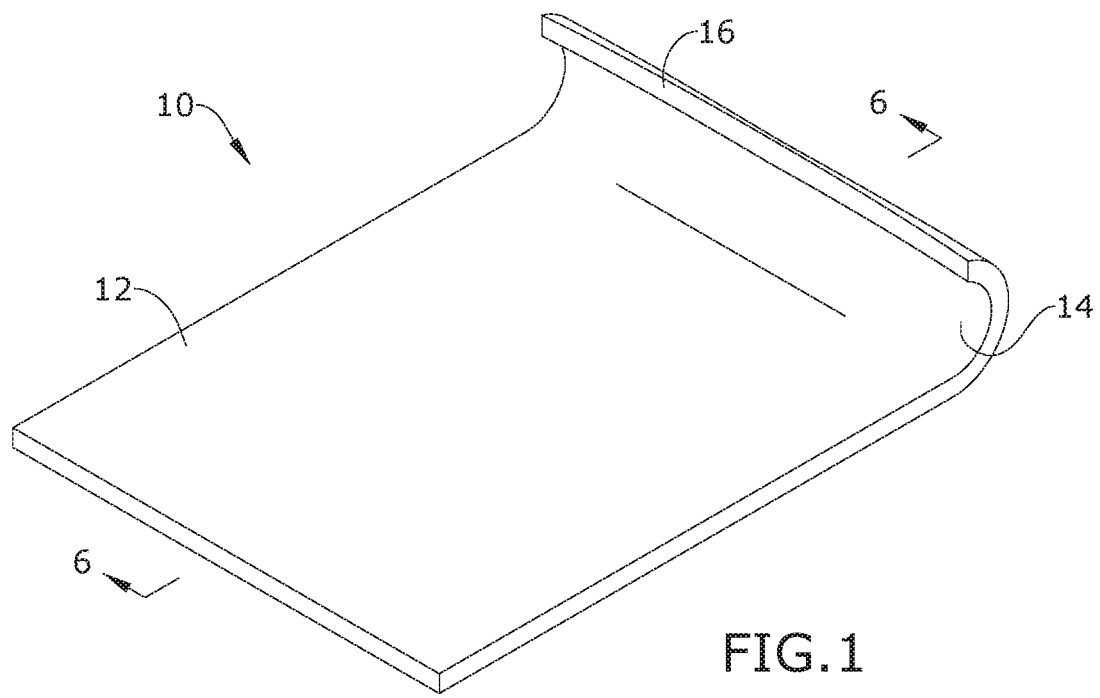
FIG. 1 is a front perspective view of an exemplary embodiment of the present invention.
Figure 2:
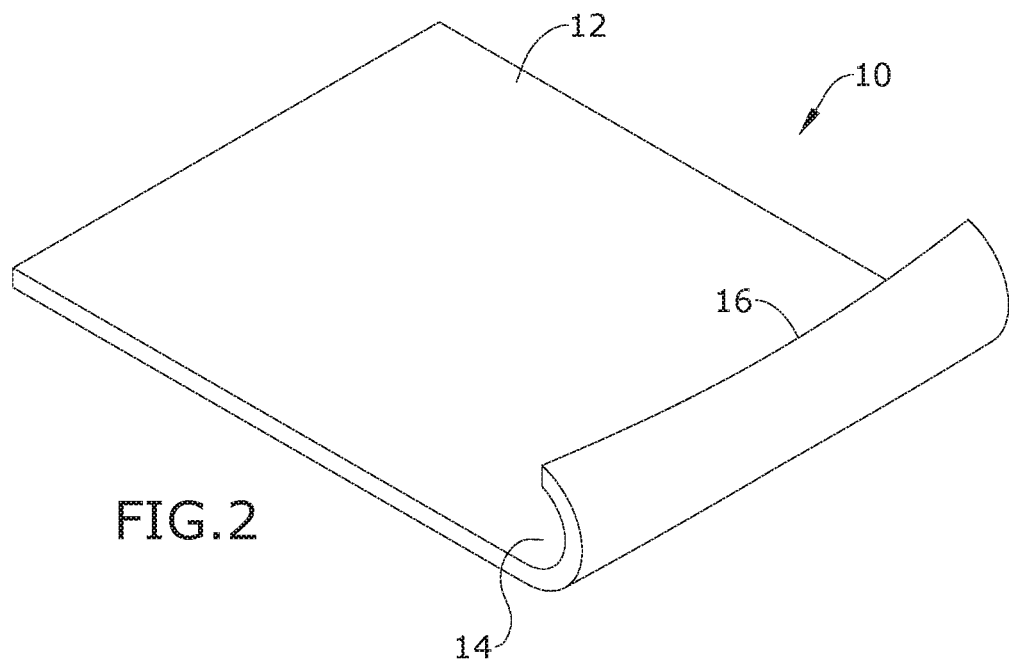
FIG. 2 is a rear perspective view of an exemplary embodiment of the present invention.
Figure 3:
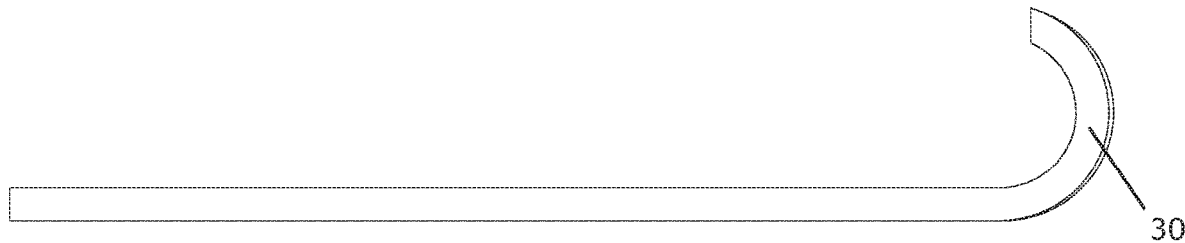
FIG. 3 is a side elevation view of an exemplary embodiment of the present invention.
Figure 4:
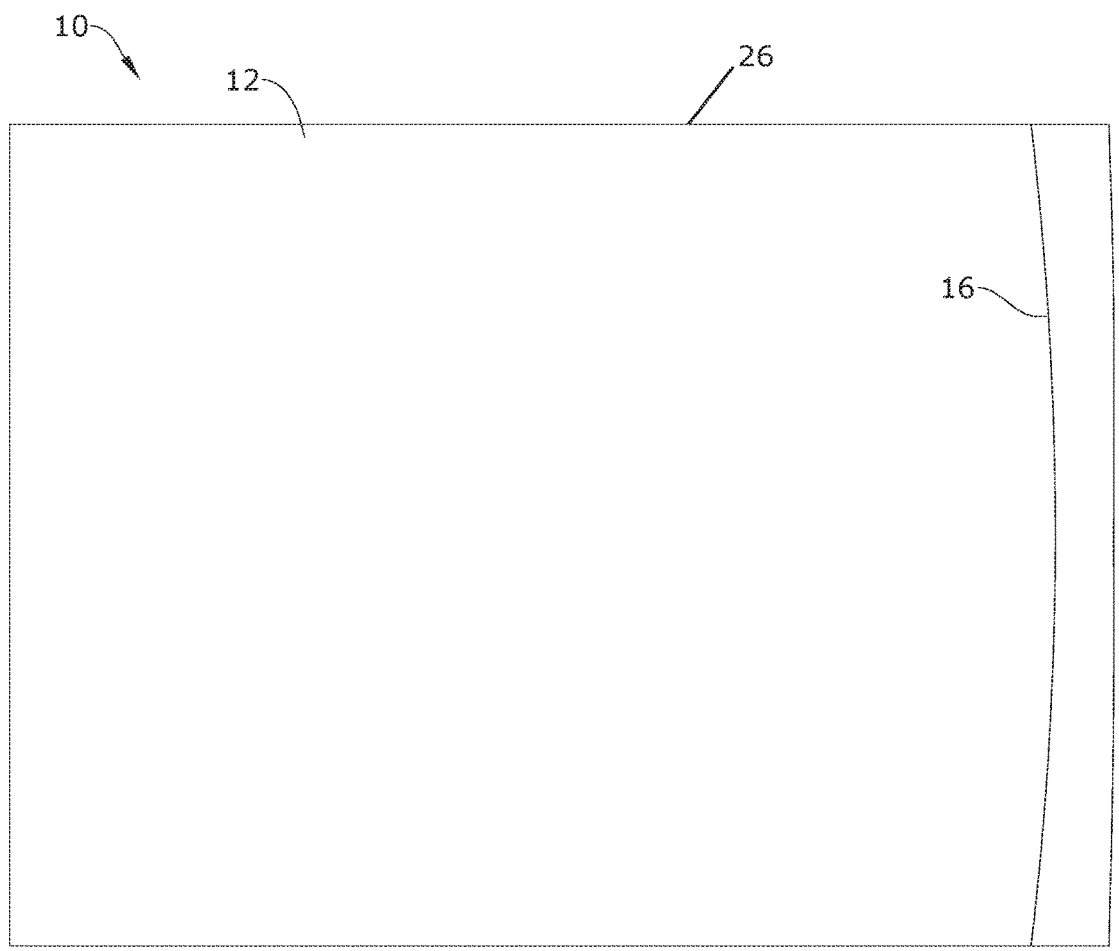
FIG. 4 is a top plan view of an exemplary embodiment of the present invention.
Figure 5:
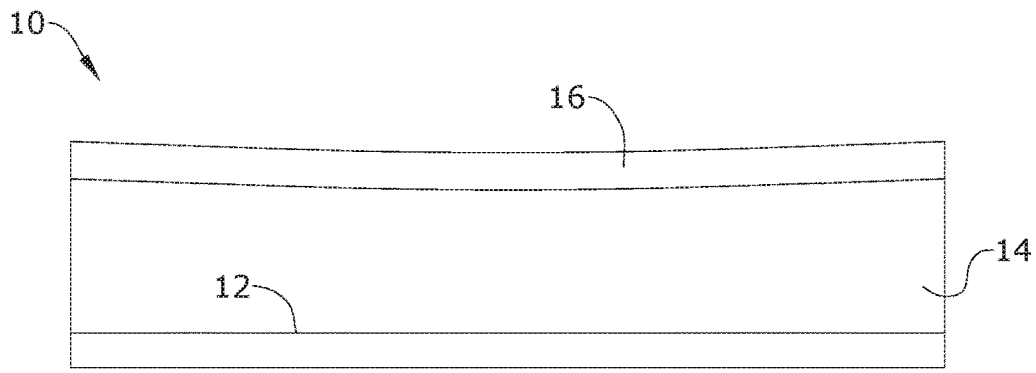
FIG. 5 is a front elevation view of an exemplary embodiment of the present invention.
Figure 6:
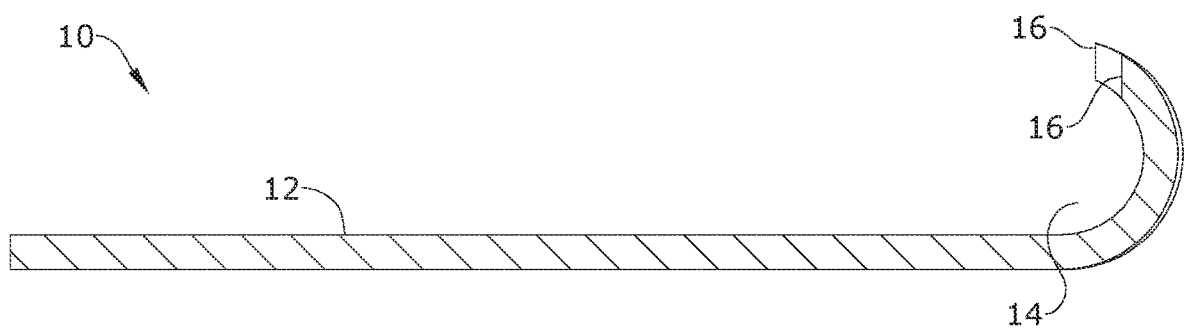
FIG. 6 is a section view of an exemplary embodiment of the present invention, taken along line 6-6 in FIG. 1.
Figure 7:
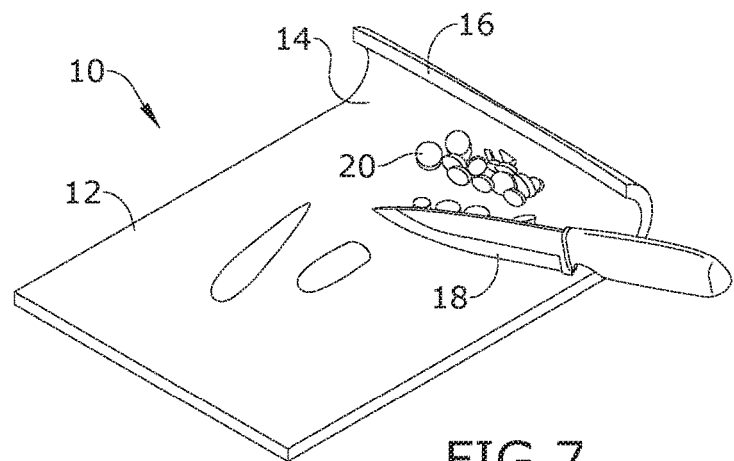
FIG. 7 is a perspective view of an exemplary embodiment of the present invention, illustrating food 20 being gathered in chamber 14.

Referring to FIGS. 1 through 9, the present invention may include a cutting board 10 having a generally flat cutting surface 12 defined by one or more first edges 26 and a chamber wall 30 along one side of the cutting board 10. The breaking-wave-shaped chamber wall 30 may extend upwardly and away from the cutting surface 12 and then curve back toward the center of the cutting surface 12, as illustrated in FIGS. 3 and 6, thereby defining a curved chamber space 14 adjacent to the cutting surface 12. The curve of the chamber wall 30 goes past 90 degrees vertical (toward the center of the cutting surface 14). The chamber space 14 provides an increase in volume over and adjacent to the cutting surface 12 for collecting and holding foodstuff 20. Thus, foodstuff 20 may be moved towards and piled up in the chamber space 14 to make room for additional foodstuff on the cutting surface 12.

The top face 16 of the chamber wall 30 may be concaved about a vertical plane, as illustrated in top plan view FIG. 4. This concavity may be defined by a radius of curvature along a horizontal plane parallel with the cutting surface 12.

In some embodiments, the top face 16 of the chamber wall 30 may bow downward as it extends toward its midpoint, as illustrated in front elevational view FIG. 5. This concavity may be defined by a second radius of curvature defined along a vertical plane perpendicular with the cutting surface 12. The top face 16 may slope away from the cutting surface 12 as the top face 16 extends from an upper edge to a lower edge.

It should be understood by those skilled in the art that the use of directional terms such as upper, lower, upward, downwardly, top and the like are used in relation to the illustrative embodiments as they are depicted in the figures, the upward/upper/top direction being toward the top of the corresponding figures and a downward/lower direction being toward the bottom of the corresponding figures.

Figure 8:
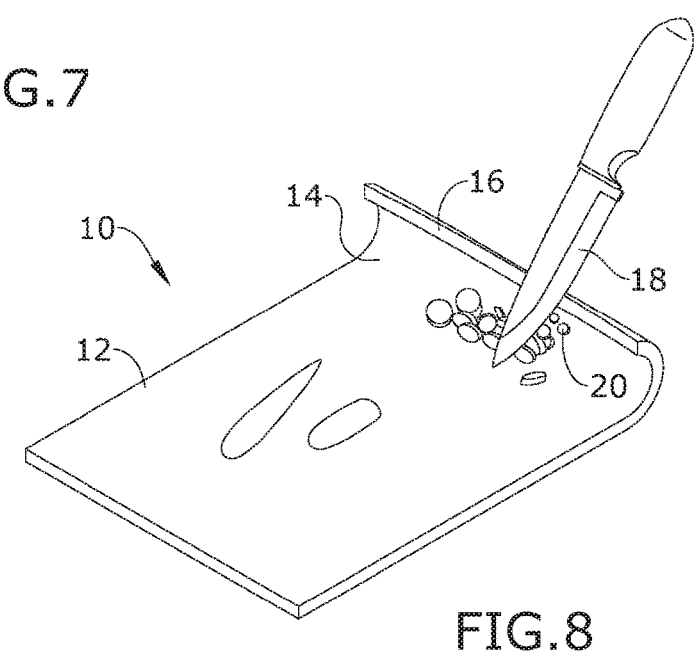
FIG. 8 is a perspective view of an exemplary embodiment of the present invention, illustrating knife 18 being scraped on edge 16.
Figure 9:
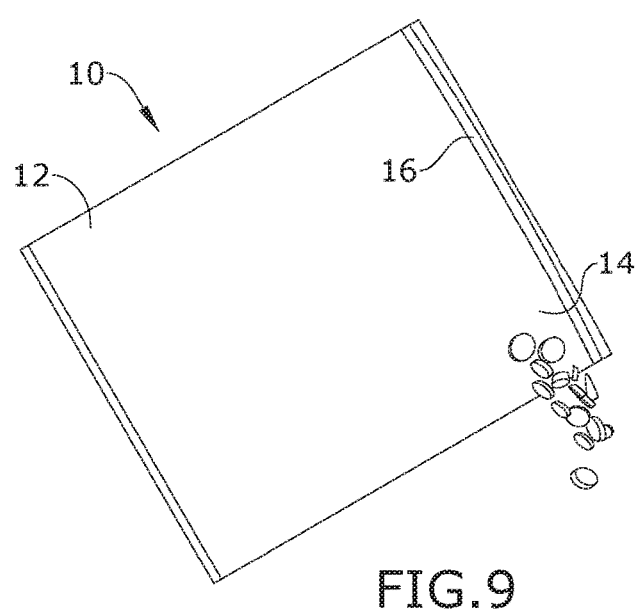
FIG. 9 is a perspective view of an exemplary embodiment of the present invention, illustrating food 20 being poured from chamber 14.

The chamber space 14 holds piled-up foodstuff 20 onto the cutting board 10 when debris or chopped food is pushed towards the curved chamber wall 30. This also allows the cutting board 10 to be tilted upwards so that food/debris/foodstuff 20 slides or tumbles toward the curved chamber wall 30 so that it can be funneled into another vessel for transfer, as illustrated in FIG. 9, by tilting the cutting board 10 in a second orthogonal direction. The upper edge of the top face 16 enables users to wipe their cutting utensil 18 of food or debris, as illustrated in FIG. 8. The curve of the chamber wall 30, and thus the top face 16, goes past 90 degrees vertical (toward the center of the cutting surface 14) so that foodstuff 20 (such as from the wiping of the cutting utensil 18) that is wiped off the cutting utensil 18 along the upper edge will fall back over onto the cutting surface 12 adjacent to or in the collection chamber 14, as opposed to over the edge of the cutting board 10 and onto the floor or countertop.

The cutting board 10 may be made of any suitable material for cutting food items thereon, and so not limited to wood or plasticized materials, and the cutting board 10 can be created by, but not limited to, extrusion or heat injection molding.

A method of using the present invention may include the following. A user preparing foodstuff 20 would cut foodstuff 20 or other objects on the flat cutting surface 12. At various time desired during the cutting process, the user can push or move the cut debris towards the curved chamber space 14. At this point the chamber wall 30 may act as a barrier for supporting the piling up of collected foodstuff 20. At any time during the process, the user is able to turn the cutting utensil 18 flat to the upper edge of the top face 16 for cleaning debris off said cutting utensil 18 so that the wiped off foodstuff 20/debris falls to the center of the cutting surface 12.

After the user finishes cutting, the user can tilt the cutting board 10 toward the chamber wall 30. The chamber wall 30 cups the debris in the collection curved chamber space 14, and enables the user to funnel the foodstuff to a desired location, whereby the foodstuff is less likely to stick to such a curved shape as opposed to a right-angled vertex of an orthogonal, planar barrier. The user can also tilt the cutting board 10 towards an adjacent edge to be able to wipe or slide the debris into another vessel.

Additionally, the cutting board 10 may not be limited to food preparation or kitchen use. This cutting board 10 could also be used for crafts and hobbies or various art uses. Any usage in which small parts are to be cut or placed on a flat surface and need to be transferred to another area or vessel. For example, bead work, fly fishing lures, fine woodwork, ammunition and bonsai maintenance are all potential uses for this cutting board.

It should be understood, of course, that the foregoing relates to exemplary embodiments of the invention and that modifications may be made without departing from the spirit and scope of the invention as set forth in the following claims.

What is claimed is:

1. A cutting board, comprising:
    a cutting surface defined in part by a chamber wall; and
    the chamber wall extends from a first end of the cutting board to a second end of the cutting board upward and away from the cutting surface before curving back toward a center of the cutting surface, wherein a distal end of the chamber wall terminates in a concave top face disposed over the cutting surface, wherein the concave top face extends from the first end of the cutting board to the second end of the cutting board and slopes away from the cutting surface as the concave top face extends from an upper edge of the concave top face to a lower edge of the concave top face, wherein the upper edge of the concave top face is configured for sliding a cutting utensil over the upper edge of the concave face so that foodstuff contacting the upper edge falls toward the center of the cutting surface.

2. The cutting board of claim 1, wherein ends of the concave top face extend farther over the cutting surface than does a midpoint of the concaved top face relative to an inner curvature of the chamber wall.

3. The cutting board of claim 1, wherein the concave top face bows downward from ends of the concave top face toward a midpoint of the concave top face.

4. A method of managing chopped foodstuff, comprising:
    providing the cutting board of claim 1,
    using the cutting surface to chop a plurality of foodstuff with the cutting utensil;
    sliding a blade of the cutting utensil over the upper edge of the concave top face so that foodstuff contacting the upper edge falls toward the center of the cutting surface;
    tilting said cutting board so that the plurality of foodstuff slides or tumbles to a chamber space defined by the chamber wall; and
    tilting said cutting board so that the plurality of foodstuff slides or tumbles along an inner curvature of the chamber wall.

\* \* \* \* \*